United States Patent Office 2,881,010
Patented Apr. 7, 1959

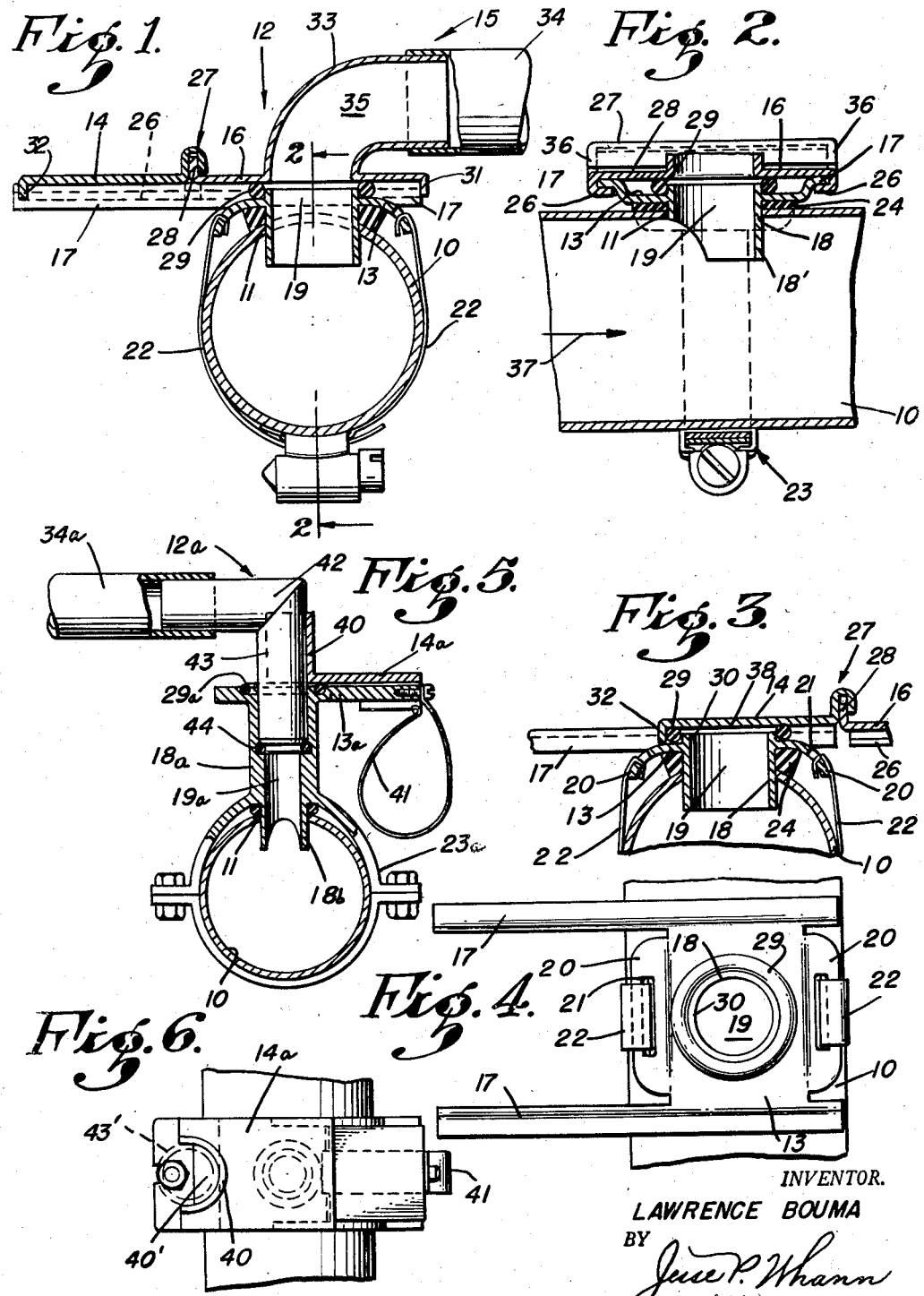

2,881,010

DETACHABLE CONNECTOR FOR MILKING SYSTEMS OR THE LIKE

Lawrence Bouma, Ontario, Calif.

Application October 31, 1955, Serial No. 543,693

6 Claims. (Cl. 284—17)

My invention relates to a detachable connector for connecting a duct to a fluid carrying device such as a pipe, and relates in particular to a system of especial value in dairy barns comprising a simple detachable connector for connecting the milking duct or tube sequentially to spaced points along a milk receiving manifold which disposed lengthwise of a bank or series of milking stalls.

It is an object of the invention to provide a system of this character wherein the work of cleaning and sterilizing the milk conducting manifold is minimized. In dairy barns the milk conveying manifold is provided with valves so that as the milking operation progresses from stall to stall, the milking tube is progressively shifted from one to the other of the valves of the milk return manifold. After each milking period this equipment must be thoroughly washed, requiring not only the circulation of boiling water and/or steam through the manifold, but also the individual washing of the valves. Since there are two milking periods each day, this tedious washing operation must be performed twice a day.

It is an object of the invention to provide a connector means for the milking tube which will not require the disassembly and washing of valves along the milk manifold as now required.

A further object of the invention is to provide a simple connector means arranged so that the cleaning thereof requires only the simple operation of flowing hot water at reasonably high velocity through the milk manifold, there being means for causing portions of this flow of water to enter the inlet ports of the connector devices with such turbulence and force as to wash the milk from the internally exposed faces of the connectors.

It is an object of the invention to provide a tube connector of the character described having an inlet port and a closure normally closing this port but being arranged for movement into a position displaced from the port, there being a ported tube connector part arranged so as to be moved into a position communicating with the inlet port of the milk manifold as the closure is displaced from its normal position of closing the inlet port, there being also means for returning the closure to its position closing the inlet port when the tube connector part is removed from communication with the inlet port in preparation for transfer to another location along the milk manifold.

It is a further object of the invention to provide a device of the character described in the preceding paragraph having means of interengagement between the tube connector and the closure member for effecting movement of the closure member into its normal position closing the inlet port as the connector member is removed from its position of communication with the inlet port, and it is a further object of the invention to provide a device of this character wherein return of the closure member to its position normally closing the inlet port is effected by resilient means when the tube connector member is removed from its position of communication with the inlet port.

It is a further object of the invention to provide a tube connecting means of the character described having a ported guide plate adapted to be clamped upon the milk manifold in communication with an opening in the manifold, a closure plate slidable on the guide plate from a position covering the port of the guide plate to a displaced position, and a tube connector having a plate which is slidable onto the guide plate so as to shift the closure plate into retracted position and then occupy the position originally held by the closure plate, thereby bringing the duct of the connector member into communication with the interior of the milk manifold or pipe through the duct which is provided in the guide plate. Disconnection of the tube connector requires only the application of a force to effect sliding of the plate of the connector off from the guide plate, the closure plate being moved, concurrently with the removal of the connector plate, back into its normal position closing the port of the guide plate.

A further object of the invention is to provide a tube connecting means of the character described having a guide plate with a closure plate slidable thereon from port closing position to retracted or displaced position, and a tube connector embracing a tubular part arranged to enter the port or opening of the guide plate when the closure plate is displaced from its normal position closing the port of the guide plate.

Further objects and advantages of the invention may be brought out in the following part of the specification wherein certain small details have been described for the purpose of competence of disclosure, without intending however, to limit the scope of the invention which is set forth in the appended claims.

Referring to the accompanying drawings which are for illustrative purposes only:

Fig. 1 is a partly sectioned elevational view of a preferred form of the invention;

Fig. 2 is a cross sectional view taken as indicated by the line 2—2 of Fig. 1;

Fig. 3 is a fragmentary sectional view corresponding in part to Fig. 1, but showing the closure member in its position normally closing the inlet port of the guide plate;

Fig. 4 is a fragmentary plan view of the guide plate;

Fig. 5 is a cross sectional view of an alternative form of the invention;

Fig. 6 is a plan view of the device shown in Fig. 5, but with the tube connection removed.

Referring first to Figs. 1 to 4, there is a milk manifold comprising a pipe 10 having a plurality of openings spaced along the top thereof according to the spacing of the stalls in the dairy barn. Only one of these openings 11 is shown in Figs. 1 to 4, for the reason that only a short portion of the pipe 10 is illustrated. A plurality of tube connector devices 12 are positioned along the pipe 10 so as to respectively communicate with the interior of the pipe 10 through the spaced openings 11.

The connector 12 includes a guide plate 13, a closure plate 14 and a tube connector 15 which includes a connector plate 16. The guide plate 13 is stamped from sheet metal and provides parallel flanges or rails 17 extending transversely of the center line on the pipe 10. Centrally of the plate 13 there is a short tube 18 which projects through the opening 11 and defines an inlet port 19. On opposite sides of the tube 18, the plate 13 has downwardly bent ears 20 provided with openings 21 arranged for engagement by the straps 22 of a clamping means 23 for securing the guide plate 13 in place on the pipe 10. A rubber gasket 24 surrounds the tube 18 in a position between the plate 13 and the contiguous portion of the pipe 10.

The plates 14 and 16 are both slidable on the guide plate 13, and for the purpose of providing guiding interengagement between the guide plate 13 and the plates 14 and 16, the plates 14 and 16 are shown as being provided with flanges or lips 26 which extend from the edges thereof downwardly around and under the rails 17 of the guide plate 13. The plates 14 and 16 are likewise provided with means of interengagement whereby movement of the connector plate 16 onto and off from the guide plate 13 will effect movement of the closure plate 14 between the two extreme positions thereof shown in Figs. 1 and 3. This means of interengagement comprises a channel 27 on one of the plates, for example, the plate 14, and a lip 28 on the other plate, for example, the plate 16 which projects into the channel 27 when the plate 16 is on the guide plate 13, as shown in Fig. 1, and cannot be disengaged therefrom until the plate 16 is pulled rightwardly from the position in which it is shown in Fig. 1 to a position wherein the lip 28 will be beyond the rightward extremity of the rails 17, as shown in Fig. 3, whereupon the plate 16 may be moved downwardly, disengaging the lip 28 from the channel 27, leaving the closure plate 14 in its normal position closing the inlet port 19 of the guide plate 13. As shown in Figs. 1–3, the tube 18 projects a short distance above the upper face of the plate 13, and a sealing ring 29 is arranged around the upper extremity 30 of the tube 18 so as to be positioned between the ported plate 13 and the closure plate 14 as shown in Fig. 3, or between the plate 13 and the connector plate 16 as shown in Figs. 1 and 2. The leftward movement of the connector plate 16 on the guide plate 13 is limited by a stop consisting of a flange 31 bent downwardly from the rightward edge of the plate 16 so as to engage the rightward ends of the rails 17, and means for limiting the rightward movement of the closure plate 14 on the guide plate 13 comprises a lip 32 bent downwardly from the leftward edge of the plate 14, between the leftward ends of the rail 17 and being positioned so as to engage the leftward portion of the sealing ring 29, as shown in Fig. 3. The connector member 12 also includes a tube 33 to which the milking tube or hose 34 is attached, this tube 33 being connected to the plate 16 so that its opening 35 will communicate with the port 19, as shown in Figs. 1 and 2, when the connector plate 16 is slid unto the guide plate 13 to its fullest extent.

As shown in Fig. 3, the closure plate 14 normally closes the inlet port 19. When the milker desires to milk the cow in the stall adjacent the parts shown in Fig. 3, he will insert the lip 28 of the connector plate 16 in the channel 27, as shown in Fig. 3, and will raise the same through the position in which the lip 28 is shown, to bring the plate 16 into alignment with the plate 14. Lateral alignment of the plate 16 with the plate 14 occurs automatically when the lip 28 is moved upwardly into the channel 27, for the reason that the channel 27 has lip-centering means consisting of end walls 36 lying adjacent the ends of the lip 28 as shown in Fig. 2. The operator then forces the connector member 12 leftwardly from the position in which it is shown in Fig. 3, causing it to slide leftwardly onto the plate 13 and shifting the closure plate 14 from the position in which it is shown in Fig. 3 to the position shown in Fig. 1 wherein it is displaced from the port 19. Connection of the hose 34 is thus quickly and easily accomplished.

When the milking operation is completed, the operator pulls the connector member 12 rightwardly from the position in which it is shown in Fig. 1, moving it off from the right end of the guide plate 13 and pulling the closure plate 14 into its position, as shown in Fig. 3, normally closing the port 19.

As shown in Fig. 2, a portion of the tube 18, facing against the direction of water flow 37, is cut away so that the remaining wall portion 18' of the tube 18 acts as a baffle to cause water to flow upwardly into the port 19. If hot water is caused to flow at relatively high velocity, the water which enters the port 19 from the interior of the pipe 10 will be highly turbulent and will thoroughly clean the inwardly exposed surface 38, Fig. 3 of the closure plate 14, the exposed portion of the sealing ring 29 and also the inner surface of the tube 18, so that it is not necessary to disassemble the parts disclosed in Fig. 3 for the purpose of cleaning the same.

In Figs. 5 and 6 I show an alternative form of the invention having a guide plate 13a with a tube 18a having a portion 18b which projects through an opening 11 in the pipe 10 when the plate 13a and its tube 18a are clamped in place as shown in Fig. 5 by clamping means 23a. A closure plate 14a is slidably arranged upon the plate 13a, and at the front end thereof has an upstanding semi-cylindrical wall 40, the axis of which is aligned with the axis of the opening 19a of the tube 18a when the plate 14a is displaced rightwardly from the position in which it is shown in Fig. 6 to the displaced or retracted position in which it is shown in Fig. 5, against the force of a spring 41 which yieldably urges the closure plate 14a toward the port closing position in which it is shown in Fig. 6.

In this form of the invention, Figs. 5 and 6, a connector member 12a is provided consisting merely of a tube 42 having an end portion 43 arranged to be moved downwardly into the upper portion of the tube opening 19a, into engagement with a sealing ring 44 located within the opening 19a between the ends thereof. When it is desired to connect the tube 34a to the pipe 10, the end portion 43 of the tube 42 is seated within the vertical, semicylindrical channel 40' of the upstanding wall 40, as indicated by the dotted circle 43' of Fig. 6. The connector 12a is then forced rightwardly so that the tube end 43 is pressed rightwardly against the wall 40, with the result that the closure plate 14a is shifted rightwardly from the position in which it is shown in Fig. 6 to the position in which it is shown in Fig. 5, whereupon the tube end 43 may be moved downwardly in the upper portion of the opening 19a into the position in which it is shown in Fig. 5. When it is desired to disconnect the hose 34a, the tube 42 is merely lifted so as to pull the end portion 43 thereof upwardly out of the opening 19a, whereupon the spring 41 will move the closure plate back into its position normally closing the upper end of the opening 19a, as shown in Fig. 6. For sealing around the upper end of the opening 19a when the closure plate 14a is in closed position, a sealing ring 29a is arranged in the upper face of the plate 13a in a position surrounding the mouth of the opening 19a.

I claim:

1. In a tube connector of the character described for use on a pipe or the like having an opening in the wall thereof: a guide plate arranged to be clamped on the pipe, said guide plate having an annular wall defining a port to communicate with said opening of said pipe, said annular wall having a portion which projects beyond the outer face of said guide plate; means for clamping said plate on said pipe; an annular sealing element disposed between said pipe and said guide plate; a closure plate connected to said guide plate and slidable thereon between a first position covering said port and a second position displaced to a side of said port; an annular sealing ring supported by said guide plate in a position surrounding the outer end of said annular wall and projecting beyond the extremity thereof so as to make sealing engagement with the inner face of said closure plate when said closure plate is in its first position; a tube connector having a connector plate arranged to be slid onto said guide plate and to engage said closure plate and move the same from its first position to its second position, thereby bringing said connector plate into a position over said port and engaging the outer portion of said sealing ring, there being guide means interconnecting said guide plate and said tube connector for guiding said tube connector as it is slid onto said guide plate, said connector plate having therein an opening communicating with said port, and a duct extending outwardly from its opening; means of interengagement between said connector plate and said closure plate adapted to move said closure plate from said second to said first position thereof when said connector plate is slid off of and disconnected from said guide plate; and stop means for limiting the movement of said closure and connector plates on said guide plate.

2. In a tube connector of the character described for use on a pipe or the like having an opening in the wall thereof: a guide plate arranged to be clamped on the pipe, having therein a port to communicate with said opening of said pipe; means for clamping said plate on said pipe; a closure plate connected to said guide plate and slidable thereon between a first position covering said port and a second position displaced to a side of said port; a tube connector having a connector plate arranged to be slid onto said guide plate and to engage said closure plate and move the same from its first position to its second position, thereby bringing said connector plate into a position over said port, there being guide means interconnecting said guide plate and said tube connector for guiding said tube connector as it is slid onto said guide plate, said connector plate having therein an opening communicating with said port, and a duct extending outwardly from its opening; an annular sealing member at the outer end of said port, projecting from said guide plate so as to make sealing engagement with the inner face of said plates; and baffle means projecting within said pipe contiguous to said port for causing a fluid circulating through said pipe to enter said port and cleanse the surfaces of said closure plate, said annular sealing member and port forming walls of said guide plate, exposed to the interior of said port.

3. In a tube connector of the character described for use on a pipe or the like having an opening in the wall thereof: a guide plate arranged to be secured on the pipe, said guide plate having an annular wall defining a port to communicate with said opening of said pipe, said annular wall having a portion which projects beyond the outer face of said guide plate; a closure plate connected to said guide plate and slidable thereon between a first position covering said port and a second position displaced to a side of said port; a tube connector having a connector plate arranged to be slid onto said guide plate and to engage said closure plate and move the same from its first position to its second position, thereby bringing said connector plate into a position over said port, there being guide means interconnecting said guide plate and said tube connector for guiding said tube connector as it is slid onto said guide plate, said connector plate having therein an opening communicating with said port, and a duct extending outwardly from its opening; and an annular sealing ring supported by said guide plate in a position surrounding the outer end of said annular wall and projecting beyond the extremity thereof so as to make sealing engagement with the inner face of said closure plate when said closure plate is in its first position.

4. In a tube connector of the character described for use on a pipe or the like having an opening in the wall thereof; a body member arranged to be secured on the pipe, having therein a port to communicate with said opening of said pipe; a closure member movable on said body member between a first position covering said port and a second position displaced to a side of said port; means connecting said closure member so that it may be moved on said body member; an annular sealing member supported by said body member in a position surrounding said port and acting to provide a seal between said body member and said closure member when said closure member is in its first position; a tube connector having a connector plate arranged to be slid onto said guide plate and engage said closure plate and move the same from its first position to its second position, thereby bringing said connector plate into a position over said port, there being guide means interconnecting said guide plate and said tube connector for guiding said tube connector as it is slid onto said guide plate, said connector plate having therein an opening communicating with said port, and a duct extending outwardly from its opening; and baffle means projecting within said pipe contiguous to said port for causing liquid flowing in said pipe to enter said port and cleanse the surfaces of parts exposed to the interior of said port.

5. In a tube connector of the character described for use with a pipe having an opening in the wall thereof: a body member arranged to be secured on the pipe, said body member having guide means and a tubular part extending therefrom into said opening, providing a port communicating with the interior of said pipe; a closure member guided by said guide means so as to be movable on said body member between a first position covering said port and a second position displaced to a side of said port; a tube connector movable into a position over said port when said closure member is moved into its second position; means for connecting said closure member to said body member; an annular sealing member of rubbery material supported by said body member in a position around said port, to make sealing engagement with said closure member when it is in its first position; and means on the inner end of said tubular part for deflecting into said port fluid which flows in said pipe, to effect a cleansing of the surfaces of parts exposed in said port.

6. A device as defined in claim 1 having baffle means projecting from said guide plate through said opening of said pipe for causing a fluid circulating through said pipe to enter said port and cleanse the exposed surface of said closure plate, said annular sealing member and the port forming walls of said guide plate.

References Cited in the file of this patent
UNITED STATES PATENTS

| | | |
|---|---|---|
| 1,137,551 | Taby et al. | Apr. 27, 1915 |
| 1,215,481 | Cantin | Feb. 13, 1917 |
| 2,460,137 | Lindeman | Jan. 25, 1949 |
| 2,725,245 | Hein | Nov. 29, 1955 |